United States Patent
Artamo et al.

(10) Patent No.: US 7,224,976 B2
(45) Date of Patent: May 29, 2007

(54) SERVICE PRIORITIES IN A MULTI-CELL NETWORK

(75) Inventors: Atte Artamo, Espoo (FI); Karl Tigerstedt, Esbo (FI); Harri Holma, Helsinki (FI); Uwe Schwarz, Veikkola (FI); Kai Heikkinen, Helsinki (FI); Achim Wacker, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/398,740

(22) PCT Filed: Oct. 9, 2001

(86) PCT No.: PCT/IB01/02221

§ 371 (c)(1),
(2), (4) Date: Oct. 14, 2003

(87) PCT Pub. No.: WO02/32160

PCT Pub. Date: Apr. 18, 2002

(65) Prior Publication Data

US 2004/0053606 A1    Mar. 18, 2004

(30) Foreign Application Priority Data

| Oct. 9, 2000 | (GB) | 0024705.6 |
| Nov. 10, 2000 | (GB) | 0027534.7 |
| Jun. 19, 2001 | (GB) | 0114965.7 |
| Jun. 20, 2001 | (GB) | 0115083.8 |

(51) Int. Cl.
H04Q 7/20    (2006.01)

(52) U.S. Cl. .................. 455/450; 455/422.1; 455/509
(58) Field of Classification Search ............... 455/450, 455/422.1, 466, 509, 449, 512, 517, 524, 455/434, 515, 525
See application file for complete search history.

(56) References Cited

U.S. PATENT DOCUMENTS 6,094,581 A    7/2000  Fried et al.
6,484,026 B1*  11/2002 Hagebarth ............... 455/419

FOREIGN PATENT DOCUMENTS

| EP | 0 844 798 A | 5/1998 |
| EP | 0 862 346 A | 9/1998 |
| JP | 08-126053 | 5/1996 |
| JP | 08-317452 | 11/1996 |
| JP | 10-145846 | 5/1998 |
| JP | 10-327463 | 12/1998 |
| JP | 11-187451 | * 7/1999 |
| JP | 2000-278735 | * 10/2000 |
| WO | WO 95/07010 | 3/1995 |
| WO | WO 98/51102 | 11/1998 |

OTHER PUBLICATIONS

English translation of Japanese Office Action dated Jul. 12, 2005.
Japanese Office Action mailed Jul. 24, 2006 with English translation.

* cited by examiner

*Primary Examiner*—Melur Ramakrishnaiah
(74) *Attorney, Agent, or Firm*—Squire, Sanders & Dempsey L.L.P.

(57) ABSTRACT

There is provided a technique for determining cell allocation in a network supporting different communication standards.

18 Claims, 2 Drawing Sheets

SERVICE PRIORITIES IN A MULTI-CELL NETWORK

FIELD OF THE INVENTION

The present invention relates to wireless communication networks in which more than one communication standard is utilised, and particularly but not exclusively to wireless communication networks which support both $2^{nd}$ and $3^{rd}$ generation functionality.

BACKGROUND TO THE INVENTION

In the near future second-generation (2G) mobile networks will be complemented and partly replaced with third generation (3G) mobile networks. In many parts of the world this will mean a transition from a situation where the 2G standard is the only dominant mobile network technology to a situation where there are two dominant mobile network technologies: 2G and 3G. In Europe, for example, there will be a switch from GSM being the sole dominant standard to GSM and 3GPP ($3^{rd}$ Generation Partnership Project) both being dominant standards.

Thus a network operator will in the future have often a mobile network containing GSM and 3GPP technology, where the 3GPP technology may be deployed using several 5 MHz 3GPP carriers. Also the cell sizes in both standards may differ from indoor and street level pico-cells and micro-cells to large macro-cells. It will then be necessary for the operator to have to decide how to serve the required traffic using the different network technologies and cell types available thereto.

The operator's goal is to maximise the number of users served and to provide some predefined coverage probability in the coverage area. The required traffic in the coverage area will consist of various connections where different quality of service (QOS) requirements are desired. QOS may be defined by, for example, bit rate, maximum allowed delay and bit error rate (BER). To maximise the number of users served, the different type of connections must be served in such a cell type and with such technology where it is possible and where it requires the least effort.

For example, consider a user equipment (UE) requesting a real-time connection at a bit rate 384 kbit/s. The operator may primarily want to serve this user with a 3GPP cell, because the 3GPP standard can provide 384 kbit/s bit rate.

In current proposed systems the operator would have to rely on cell selection or handover algorithms provided by the vendor, which might not result in satisfactory distribution of different type of connections in the available technologies and cell types from the operators point of view.

In the second-generation systems e.g. GSM and IS-95, the problem of dividing required traffic to cells with different technology and type based on the service type is not important for two reasons. Firstly, in second generation systems the required traffic consists mostly of speech services. Data services are also possible but are less used than speech. The variety in the offered traffic in terms of bit rates, maximum delay and BER requirements is significantly smaller than in 3GPP networks. Secondly, prior to the deployment of 3GPP networks it has not been common for an operator to operate a network consisting of systems from several standards, where intersystem handovers would be possible.

It is an aim of the present invention to provide an improved technique for selecting a target cell in a wireless communication system supporting more than one communication standard.

SUMMARY OF THE INVENTION

In accordance with the present invention there is provided a method of determining cell allocation for a user in a wireless network, the network having a plurality of cell types and users having at least one of a plurality of service types, including defining a priority table comprising, for each service type, a priority for each cell type.

The cell allocation may be cell selection or handover.

The method may further include defining a plurality of priority tables. The method may further include defining a priority table for each cell in the network. The method may further comprise defining a priority table for a group of cells in the network.

The method may further include defining a first type of priority table, wherein each service type in the first type of priority table corresponds to the plurality of service types supported by the network. The first type of priority table may be used to determine cell allocation for a user equipment connected in the network. The cell allocation may be determined using the priority table associated with the cell to which a user equipment is connected.

The method may further include defining a second type of priority table, wherein each service type in the second type of priority table corresponds to at least one service type supported by a user equipment.

Each service type may correspond to at least one service type previously accessed by a SIM card in a user equipment.

The second type of priority table may be used to determine cell allocation for a user equipment which is idle.

Responsive to the availability of a plurality of cell types for a user, the user may be connected in the one of the plurality of cells having the highest associated priority based on the service type of the user.

The availability of cell types may be determined in a measuring step.

The present invention further provides a method of determining cell allocation for a user in a wireless network, the network having a plurality of cell types and users having at least one of a plurality of service types, comprising: measuring signal strengths of signals received from at least one cell in a user equipment; determining those received signals having a signal strength above a determined threshold; defining a priority table comprising, for each service type, a priority for each cell type; determining a cell to connect the user equipment in dependence on the allocated priority for those cells having a signal strength above the threshold. The priority table may be defined by the network operator.

The present invention still further provides a wireless communication network having a plurality of cell types for supporting users having at least one of a plurality of service types, wherein there is defined a priority table in which for each service type there is defined a priority for each cell type.

There is preferably defined a plurality of priority tables.

Preferably there is defined a priority table for each cell in the network.

There may be defined a first type of priority table, wherein each service type in the first type of priority table corresponds to the plurality of service types supported by the network.

The first type of priority table may be used to determine cell allocation for a user equipment connected in the network.

There may be defined a second type of priority table, wherein each service type in the second type of priority table corresponds to at least one service type supported by a user equipment.

Each service type may correspond to at least one service type previously accessed by a SIM card in a user equipment.

The second type of priority table may be used to determine cell allocation for a user equipment which is idle.

A user may be connected to an available cell having the highest priority for the service type or equipment type of the user.

The invention may also provide a network element in a wireless communication system, the communication system having a plurality of cell types for supporting users having at least one of a plurality of service types, wherein there is stored in said network element, for each cell, a priority table comprising, for each service type, a priority for each cell type.

The invention therefore proposes a priority table that enables a network operator to easily associate different types of requested connections with prioritised technology and cell type. The priority table is preferably used in idle mode or in connected mode when the user equipment is performing cell selection or handover.

The operator's goal will be to maximise the number of users served and to provide some predefined coverage probability in the coverage area. The required traffic in the coverage area will consist of connections where different qualities of service (QOS) requirements are desired. To maximise the number of users served, the different type of connections must be served in such cell type and with such technology where it is possible and where it requires the least effort. This invention proposes a priority table which enables the operator to easily associate different types of requested connections with prioritised technology and cell type. The priority table will then be used in idle or in connected mode when a UE is performing cell selection or handover.

The invention enables the network operator to readily direct different connection types to be served with desired technology in desired cell types.

Without this invention the operator would have to rely on cell allocation algorithms provided by the vendor, which might not result in satisfactory distribution of different type of connections in the available technologies and cell types from operator's point of view.

DESCRIPTION OF PREFERRED EMBODIMENT

The invention will now be described by way of reference to a particular, non-limiting, example. The example chosen is that of a network having both 2G and 3G services. The 2G services are GSM services, and the 3G services are 3GPP. In this example it is also assumed that the network supports enhanced 2G services, specifically EDGE. Furthermore for each of the services, it is assumed that the network provides both micro-cells and macro-cells.

Figure 1:
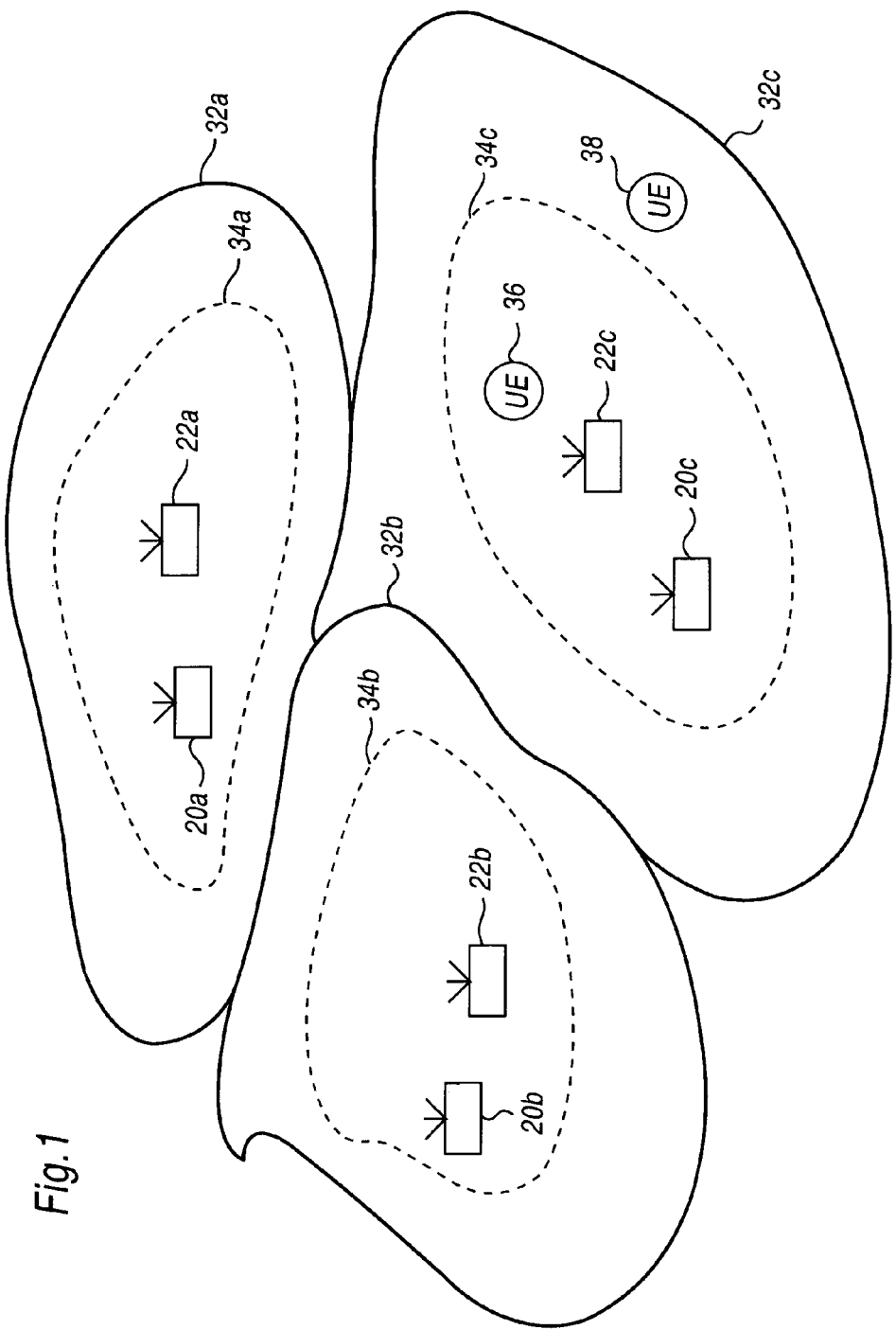
FIG. 1 illustrates a cell structure of a GSM and 3GPP combined network.

FIG. 1 illustrates cell coverage in such a network. FIG. 1 illustrates three GSM cells 32*a* to 32*c*. Each cell is supported by a GSM base station 22*a* to 22*c*. In addition, within each GSM cell there is provided 3GPP cell coverage, as illustrated by the dashed lines defining 3GPP cells 34*a* to 34*c*. In the example shown, it is assumed that 3GPP coverage is more restricted than GSM coverage. Each of the 3GPP cells is supported by a base station 20*a* to 20*c*. It should be noted that the 3GPP base stations are not necessarily co-located with the GSM base stations. The GSM base stations 22*a* to 22*c* may also support enhanced GSM operation, such as EDGE. Although not shown in FIG. 1, such enhanced operation will effectively create EDGE cells, such that a third cell coverage is provided, different to that of the GSM coverage and the 3GPP coverage. It should also be noted that the actual cell structure, for each type of standard, may differ. For example cells may be a mixture of micro-cells and macro-cells.

In FIG. 1 there is shown a UE 36. It should be appreciated that the particular type or construction of the UE is not important to the present invention. The UE may, for example, be a mobile telephone. However the UE may be any type of equipment which utilises cell allocation technique in accordance with the present invention.

As can be seen this UE 36 is within the GSM and 3GPP cell coverage area 34*c*, and therefore potentially may be connected to the network using either standard. It is an aim of the present invention, as discussed hereinbelow, to ensure that the UE 36 is connected to the network using the one of the network standards which is most appropriate to maximise general usability of the network. Referring further to FIG. 1, a further UE 38 is only within the GSM cell coverage area 32*c*, and therefore may only be connected to the network by the GSM standard.

Figure 2:
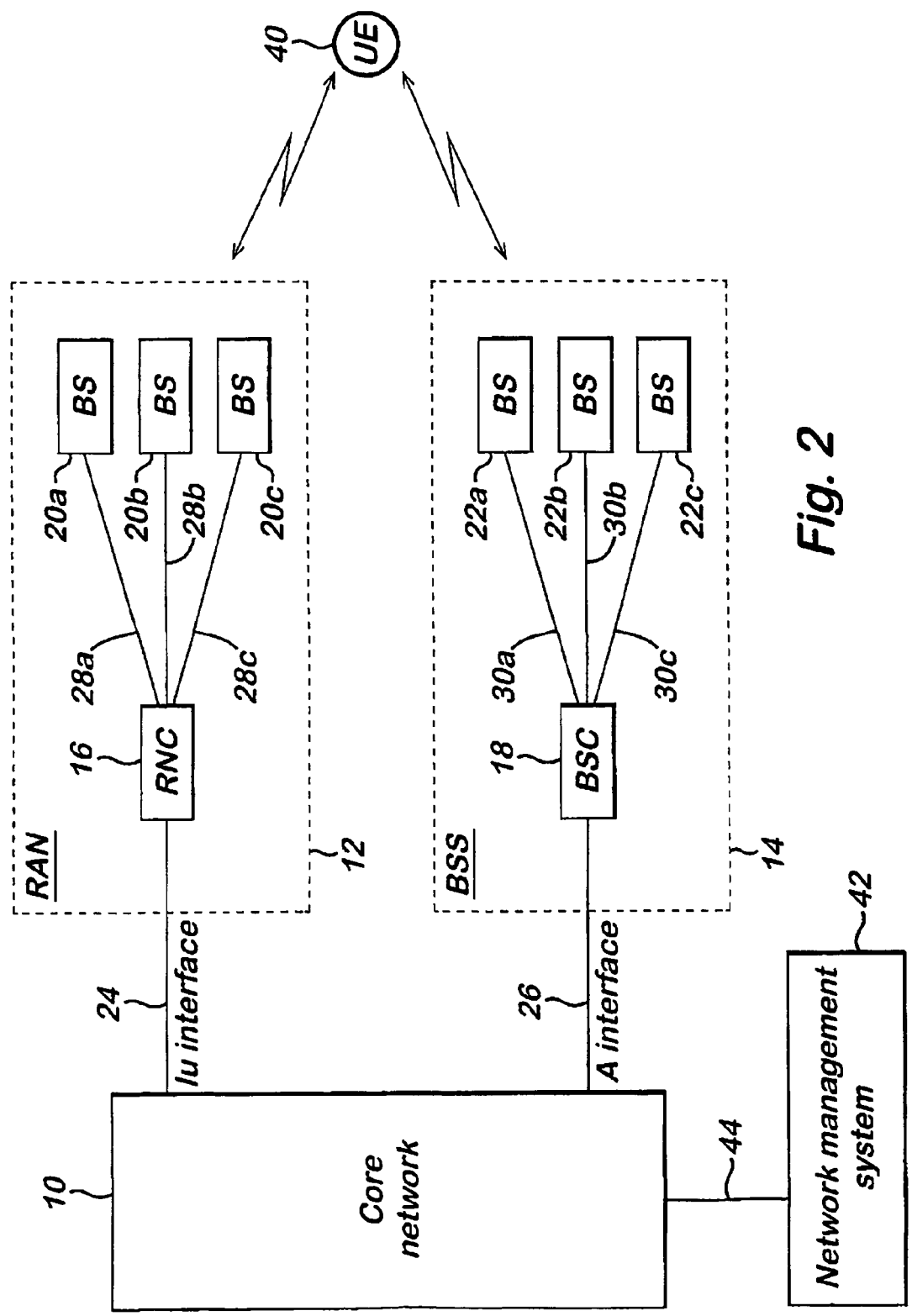
FIG. 2 illustrates the basic network architecture of a GSM and 3GPP combined wireless network.

Referring to FIG. 2, there is illustrated the basic elements of the network infrastructure to support a cell structure as shown in FIG. 1. Network elements in FIG. 2 corresponding to those shown in FIG. 1 are identified by the same reference numerals.

Each of the GSM base stations 22*a* to 22*c* are connected by respective communication links 30*a* to 30*c* to a base station controller (BSC) 18. The base station controller 18 and the base stations 22 together form the base station subsystem (BSS). It will be appreciated by one skilled in the art that the base station subsystem may include more than one base station controller.

Each of the 3GPP base stations 20*a* to 20*c* are connected by respective communication links 28*a* to 28*c* to a radio network controller (RNC) 16. The radio network controller 16 and the base stations 20 together form the radio access network (RAN). It will be appreciated by one skilled in the art that the radio access network may include more than one radio network controller.

The radio network controller 16 and the base station controller 18 are each connected to a core network block 10 by respective communication links 24 and 26.

It will be appreciated that the network structure of FIG. 2 does not illustrate the geographical layout of the various base stations, which is more clearly exemplified by FIG. 1. FIG. 2 shows a UE 40, which connects to the core network 10 via one of the base stations 20 or 22. The core network receives control information, such as network parameters, from a network management system 42 via communication line 44.

In accordance with the present invention, the connection of any given UE into the network is determined based on the service type required by the UE, and the cells available to the UE for connection. In the preferred embodiment of the invention, the connection of the UE is dependent upon whether the UE is already connected and a handover is to take place, or whether the UE is currently idle and a new connection is to be made. In idle mode UE's may also change cell; this is referred to as cell selection.

In accordance with the present invention, a set of priority tables are defined in order to assist in determining the cell to which a UE should connect. As discussed further hereinbelow, in the preferred embodiment of the present invention, a priority table is defined for each cell in the network. The priority tables are preferably stored in the RNC 16 and the BSC 18. Each RNC or BSC stores, in the preferred embodiment, a priority table for each base station that the respective RNC or BSC controls. The invention will be discussed further hereafter with reference to specific examples.

Each priority table, specific to a cell, lists all the types of service available in the network against all the types of cell available in the network, and allocates a priority to each of those given cells for each of those given type of service. The priority table is defined as unique to a cell.

If a UE requiring a certain service type is currently connected in a particular cell, and in a handover may be connected to more than one type of cell, then the cell is chosen in accordance with the priority table defined for the cell in which the UE is currently connected. The following examples illustrate this further.

In the following examples, two scenarios are discussed. In the first scenario, a UE is in 'connected' mode. In the second scenario, a UE is in 'idle' mode.

In idle mode the UE is turned on, but the channel which transfers user information, e.g. the speech channel, is not established. The core network, and more specifically the mobile switching centre, knows the location area of the idle UE, which area consists of a group of cells. If the core network needs to direct a new call to a UE which is in idle mode, then it must first locate the cell where the UE is located. This must be done before a channel is established, and is known as paging. In idle mode the UE is camped in a particular cell, and if the idle UE is moving in the network then the RNC or BSC selects the new cell for the UE to camp in. This process is referred to as cell selection. In the idle mode, the UE must also listen for paging messages from the network. If an idle UE moves to a cell which belongs to a different location area, then the idle UE must send a location area update to the core network.

In the 'connected' mode, a channel to transfer user information is established. The core network specifically knows the location of the UE cell. In connected mode, a handover takes place when a UE changes cell.

In both connected and idle mode the UE performs handover and cell selection measurements, and sends them to the RNC or BSC. The RNC or BSC then decides to which cell the UE should belong.

Thus in both idle and connected modes there is a need to perform cell allocation, either for cell selection in idle mode or for handover in connected mode.

Referring to Table I there is illustrated an example priority table defined for user equipment connected in the network scenario of FIGS. 1 and 2. In this example, it is assumed that the UE's are already connected to a particular cell in the network.

TABLE I

| Traffic class/ maxbitrate [kbit/s] | Conversational speech 12.2 | Conversational 384 | Streaming 32 | Streaming 384 | Interactive 32 | Interactive 1024 | Background 32 | Background 1024 |
|---|---|---|---|---|---|---|---|---|
| GSM micro | 1 | — | 5 | — | 5 | — | 5 | — |
| GSM macro | 2 | — | 6 | — | 6 | — | 6 | — |
| EDGE micro | 3 | 1 | 1 | 1 | 1 | 3 | 1 | 3 |
| EDGE macro | 4 | 2 | 2 | 2 | 2 | 4 | 2 | 4 |
| 3GPP micro | 5 | 3 | 3 | 3 | 3 | 1 | 3 | 1 |
| 3GPP macro | 6 | 4 | 4 | 4 | 4 | 2 | 4 | 2 |

Table I contains all the different cell types and all the different service types (technologies) available in the network example of FIGS. 1 and 2. It should be noted that in other network scenarios other cell types and other service types may be provided, and the invention is not limited to the types listed in Table 1. Table 1 is assumed to be all the network possibilities that exist in the operator's coverage area for the example discussed herein. All the cell types will not be available everywhere in the cell coverage area. Hence, the cell type having the highest priority for a particular traffic type will not always be available for selection. As discussed further hereinbelow, preferably the choice of the most prioritised cell is made from the available cell types which are included in UE's measurement report.

In order to further illustrate the present invention and the use of the priority table, an example of cell allocation utilising the present invention as exemplified by the priority table shown in Table I is now described. It is assumed that a particular UE is currently connected in an interactive 32 kbit/sec call in a GSM micro cell. The previous cell allocation is not important, but it is assumed, for example, that in the previous cell allocation only the GSM micro cell was available for connection. In accordance with known handover techniques, the UE returns cell measurements to the BSC 18 through which the call is currently connected. In returning those handover measurements, the BSC determines that there are three cells returning measurement values which are good enough for handover. For the purposes of this example, it is assumed that those cells are identified as: a GSM micro cell, an EDGE micro cell, and a 3GPP micro cell.

As the UE is currently connected in a specific GSM micro cell, then the BSC compares the type of cells available to the priority table for that cell, which it is assumed is the priority table of Table I above. Referring to Table I above, the BSC looks up column 5, the column for the current type of call (interactive 32 kbit/sec). Referring to this column of Table I above, it can be seen that the three available cells for the handover correspond to cells having priorities of 1 (EDGE micro cell), 3 (3GPP micro cell), and 5 (GSM micro cell). On this basis, the highest priority cell for the handover is the EDGE micro cell, and therefore this cell is selected for the handover, and the handover takes place through the BSC.

It should be noted that the mechanism for handover between cells in accordance with the present invention is in accordance with known techniques. The present invention is utilised in the cell allocation step.

It should also be noted that the above described example refers to the case where a UE handover takes place without any change in a call type. If the type of service required by a UE changes during a call, then a similar handover may occur based on the priority table for the existing cell and the availability of other cells for a handover.

Referring to Table II there is illustrated a further example of a priority table defined for user equipment connected in the network scenario of FIGS. 1 and 2. In this example, it is assumed that the UE's are in idle mode.

TABLE II

| classmark | Only GSM capable UE | GSM, EDGE capable UE | GSM, EDGE, 3GPP capable UE |
|---|---|---|---|
| GSM micro | 2 | 4 | 6 |
| GSM macro | 1 | 3 | 5 |
| EDGE micro | — | 2 | 4 |
| EDGE macro | — | 1 | 3 |
| 3GPP micro | — | — | 2 |
| 3GPPmacro | — | — | 1 |

In idle mode the connection type which the mobile will next request is not known. Thus in this preferred embodiment the selection of cell type and technology may be based on the service history of the particular SIM (subscriber identity module) card used in the UE, or on the UE class mark. The UE class mark defines the standards that the UE is capable to support, i.e. the UE capabilities. Thus, in idle mode, the service type can be understood to be the service types which the UE is capable of supporting rather than the service types which the user may wish to use. Similarly the service type may be considered to be the service types previously accessed using a SIM card provided in the UE.

A further more detailed description of an example implementation of the invention is now described, by way of reference to all the previously described drawings.

In accordance with conventional wireless network techniques, the network management system (NMS) 42 sets the handover triggering thresholds and provides this information to the radio network controller 16 and the base station controller 18. Again in accordance with conventional techniques, a handover trigger may be detected in the RNC 16 or the BSC 18. The handover trigger may be as a result, for example, of load changes, service changes, or coverage changes.

Once again in accordance with conventional techniques, responsive to the handover trigger the RNC 16 or the BSC 18 commands the identified UE (or UE's) to make cell selection or handover measurements. The UE then returns the cell selection or handover measurements to the RNC 16 or the BSC 18.

The RNC 16 or the BSC 18 then selects the target cell for the UE based on the measurements obtained by the RNC or the BSC (as provided by the UE), the service priorities, and the load information. The information about the load in the cells listed in the measurement report may not always be available. The RNC 16 or BSC 18 looks for the acceptable cells in the measurement report in terms of radio link quality.

In accordance with the present invention, and as described hereinabove, the priority tables discussed above are then used for cell allocation, i.e. selection of the target cell, in either idle mode or connected mode for a UE. The RNC 16 or BSC 18 then checks the priority list defined for the current cell, starting from the highest priority cell type and the appropriate desired technology, the RNC or BSC checks if the cell was among the acceptable ones in the measurement report of the mobile. If it was the UE is then connected to the cell in question. If the highest priority cell was not in the UE's measurement report the next highest priority cell is selected from the priority list. If none of the cells listed in measurement report are on the priority list, then the service based cell allocation is omitted, and the other criteria of selecting the best cell take effect.

The priority table for a particular cell defined in the RNC or BSC may be modified by the network operator in the network management system 42.

In the above-described examples, the priority tables are described as being specific, or unique, to a cell. However the invention is not limited to such an arrangement. In an alternative, the priority table may be defined for larger entity. For example a priority table may be specific to a group of cells. Furthermore, in further embodiments priority tables may be defined as specific to particular UE's, SIM cards, or otherwise. One skilled in the art will appreciate the broader applicability of the concept of allocating priority tables in accordance with the invention in order to assist in improving allocating network resources more efficiency.

As discussed above, the priority table is used when a UE is performing cell allocation in idle mode or in connected mode. In the described preferred embodiments, the priority tables are stored in the RNC or BSC, because it is the RNC or BSC that performs the selection of a target cell. However, the invention is not limited to the priority tables being stored in the RNC or BSC, and other locations may be used. The priority tables are preferably defined by, and modified by, the network management system.

In order to implement the preferred embodiments as described herein, it is proposed that the preferable mode of implementation is to add to the NMS 42 a cell specific possibility to define a priority table for each cell in the operator's network. The priority list is preferably separately defined for UE's in idle mode and in connected mode. The priority table takes effect when the RNC or BSC receives a measurement report from a mobile. The priority table for the current cell of the UE is used.

The present invention has been described hereinabove by way of reference to various specific examples. One skilled in the art will appreciate the broad applicability of the invention beyond these examples. The scope of the invention is defined by the appended claims.

The invention claimed is:

1. A method of determining cell allocation for a user in a wireless network, the method comprising:
   defining a priority table comprising, for each service type, a priority for each cell type;

defining a first type of priority table, wherein each service type in the first type of priority table corresponds to the plurality of service types supported by the network;

using the first type of priority table to determine cell allocation for a user equipment connected in the network;

defining a second type of priority table, wherein each service type in the second type of priority table corresponds to at least one service type supported by a user equipment; and using the second type of priority table to determine cell allocation for a user equipment which is idle, wherein the network includes a plurality of cell types and users having at least one of a plurality of service types.

2. A method according to claim 1 further including defining a plurality of priority tables.

3. A method according to claim 2 further including defining a priority table for each cell in the network.

4. A method according to claim 2 further comprising defining a priority table for a group of cells in the network.

5. A method according to claim 1 further comprising determining the cell allocation using the priority table associated with the cell to which a user equipment is connected.

6. A method according to claim 1 wherein each service type corresponds to at least one service type previously accessed by a SIM card in a user equipment.

7. A method according to claim 1 further comprising:
connecting the user in the one of the plurality of cells having the highest associated priority based on the service type of the user, when responsive to an availability of a plurality of cell types for a user.

8. A method according to claim 1 further comprising:
a measuring step that determines an availability of cell types.

9. A method according to claim 1, wherein in defining the priority table, the priority table is defined by the network operator.

10. A method of determining cell allocation for a user in a wireless network, comprising:
measuring signal strengths of signals received from at least one cell in a user equipment;
determining those received signals having a signal strength above a determined threshold;
defining a priority table comprising, for each service type, a priority for each cell type;
determining a cell to connect the user equipment in dependence on the allocated priority for those cells having a signal strength above the threshold;
defining a first type of priority table, wherein each service type in the first type of priority table corresponds to the plurality of service types supported by the network;
using the first type of priority table to determine cell allocation for a user equipment connected in the network;
defining a second type of priority table, wherein each service type in the second type of priority table corresponds to at least one service type supported by a user equipment; and
using the second type of priority table to determine cell allocation for a user equipment which is idle,
wherein the network includes a plurality of cell types and users having at least one of a plurality of service types.

11. A wireless communication network comprising:
a defined priority table in which for each service type there is defined a priority for each cell type;
a defined first type of priority table, wherein each service type in the first type of priority table corresponds to the plurality of service types supported by the network, and wherein the first type of priority table is used to determine cell allocation for a user equipment connected in the network; and
a defined second type of priority table, wherein each service type in the second type of priority table corresponds to at least one service type supported by a user equipment, wherein the second type of priority table is used to determine cell allocation for a user equipment which is idle,
wherein the wireless communication network includes a plurality of cell types for supporting users having at least one of a plurality of service types.

12. A wireless communication network according to claim 11 further comprising a defined plurality of priority tables.

13. A wireless communication network according to claim 11 wherein a priority table is defined for each cell in the network.

14. A wireless communication network according to claim 11 wherein each service type corresponds to at least one service type previously accessed by a SIM card in a user equipment.

15. A wireless communication system according to claim 11 wherein a user is connected to an available cell having the highest priority for the service type or equipment type of the user.

16. A network element comprising:
a priority table for each cell, comprising, for each service type, a priority for each cell type;
a defined first type of priority table, wherein each service type in the first type of priority table corresponds to the plurality of service types supported by the network, wherein the first type of priority table is used to determine cell allocation for a user equipment connected in the network; and
a defined second type of priority table, wherein each service type in the second type of priority table corresponds to at least one service type supported by a user equipment, wherein the second type of priority table is used to determine cell allocation for a user equipment which is idle,
wherein the network element is included in a wireless communication system, the communication system having a plurality of cell types for supporting users having at least one of a plurality of service types.

17. A wireless communication network comprising:
means for providing a defined priority table in which for each service type there is defined a priority for each cell type;
first defining means for defining a first type of priority table, wherein each service type in the first type of priority table corresponds to the plurality of service types supported by the network, and wherein the first type of priority table is used to determine cell allocation for a user equipment connected in the network; and
second defining means for defining a second type of priority table, wherein each service type in the second type of priority table corresponds to at least one service type supported by a user equipment, wherein the second type of priority table is used to determine cell allocation for a user equipment which is idle,
wherein the wireless communication network includes a plurality of cell types for supporting users having at least one of a plurality of service types.

18. A network element comprising:
- means for providing a priority table for each cell, comprising, for each service type, a priority for each cell type;
- a first defining means for defining a first type of priority table, wherein each service type in the first type of priority table corresponds to the plurality of service types supported by the network, wherein the first type of priority table is used to determine cell allocation for a user equipment connected in the network; and
- a second defining means for defining a second type of priority table, wherein each service type in the second type of priority table corresponds to at least one service type supported by a user equipment, wherein the second type of priority table is used to determine cell allocation for a user equipment which is idle, wherein the network element is included in a wireless communication system, the communication system having a plurality of cell types for supporting users having at least one of a plurality of service types.

* * * * *

UNITED STATES PATENT AND TRADEMARK OFFICE
CERTIFICATE OF CORRECTION

| | | |
|---|---|---|
| PATENT NO. | : 7,224,976 B2 | Page 1 of 1 |
| APPLICATION NO. | : 10/398740 | |
| DATED | : May 29, 2007 | |
| INVENTOR(S) | : Atte Artamo | |

It is certified that error appears in the above-identified patent and that said Letters Patent is hereby corrected as shown below:

Claim 15, Column 10, Line 24:
Delete the word "system" and replace with the word --network--

Signed and Sealed this

Fourteenth Day of July, 2009

JOHN DOLL
*Acting Director of the United States Patent and Trademark Office*